(12) United States Patent
Elmandouh

(10) Patent No.: US 11,132,471 B1
(45) Date of Patent: Sep. 28, 2021

(54) METHODS AND APPARATUS FOR SECURE ACCESS

(71) Applicant: Waleed A. Elmandouh, League City, TX (US)

(72) Inventor: Waleed A. Elmandouh, League City, TX (US)

( * ) Notice: Subject to any disclaimer, the term of this patent is extended or adjusted under 35 U.S.C. 154(b) by 0 days.

(21) Appl. No.: 16/999,362

(22) Filed: Aug. 21, 2020

(51) Int. Cl.
*G06F 21/83* (2013.01)
*G06F 21/85* (2013.01)
*G06F 15/173* (2006.01)
*G06F 21/60* (2013.01)
*G06F 21/78* (2013.01)
G06F 21/71 (2013.01)

(52) U.S. Cl.
CPC ........ *G06F 21/85* (2013.01); *G06F 15/17337* (2013.01); *G06F 21/602* (2013.01); *G06F 21/78* (2013.01)

(58) Field of Classification Search
None
See application file for complete search history.

(56) References Cited

U.S. PATENT DOCUMENTS

| | | | | |
|---|---|---|---|---|
| 6,256,014 | B1* | 7/2001 | Thomas | G06F 3/023 345/157 |
| 8,615,656 | B2* | 12/2013 | Weinstein | H04L 63/0471 713/168 |
| 2008/0016081 | A1* | 1/2008 | MacMillan | G06F 16/437 |
| 2008/0141313 | A1* | 6/2008 | Kato | H04N 21/4143 725/62 |
| 2010/0070654 | A1* | 3/2010 | Sugahara | G06F 3/1454 710/1 |
| 2010/0223417 | A1* | 9/2010 | Cheng | G06F 3/1423 710/316 |
| 2013/0054794 | A1* | 2/2013 | Liu | G06F 3/023 709/224 |
| 2016/0203343 | A1* | 7/2016 | Soffer | G06F 13/4022 726/34 |
| 2017/0353347 | A1* | 12/2017 | Li | G06F 3/14 |
| 2019/0088233 | A1* | 3/2019 | Chew | G06F 21/602 |
| 2019/0289042 | A1* | 9/2019 | Perreault | H04L 67/2871 |
| 2020/0019417 | A1* | 1/2020 | Puthillathe | G06F 16/986 |
| 2020/0057508 | A1* | 2/2020 | Menachem | G06F 21/62 |
| 2020/0358832 | A1* | 11/2020 | Perreault | H04L 65/608 |

OTHER PUBLICATIONS

CyberLiveApp: A secure sharing and migration approach for live virtual desktop applications in a cloud environment. Li et al. Elsevier. (Year: 2013).*
CN 110794971. Xu. (Year: 2020).*

* cited by examiner

*Primary Examiner* — Venkat Perungavoor
(74) *Attorney, Agent, or Firm* — Noblitt & Newson, PLLC

(57) ABSTRACT

Methods and apparatus for secure access generally comprise a secure interface operating in conjunction with a remote computer and a target machine. The secure interface may provide access to the target machine by the remote computer. The secure interface may comprise a signal transfer system configured to be coupled to the target machine. The signal transfer system may transfer native human I/O signals, but does not transfer files and does not transfer networking signals. The signal transfer system may provide the only couplings to the target machine. The secure interface may also include a network interface coupled to the signal transfer system.

20 Claims, 5 Drawing Sheets

METHODS AND APPARATUS FOR SECURE ACCESS

BACKGROUND

Many businesses require or could benefit from secured remote access to any of their computers for any reason. Example industries include oil and gas plants, power plants (conventional or nuclear), banks, military facilities, security agencies, and private citizens.

Conventionally accessing any computer desktop remotely through the Internet, however, poses a security risk. Data can be transferred to and/or from the accessed computer, which means data files can be stolen from that computer or the systems coupled to it and viruses, malware, Trojans, and other unauthorized programs and content can be planted in that computer or the systems coupled to it. While firewalls, proxy servers, and other software- and hardware-based solutions may provide protection against such unauthorized access, they are not fully secured.

SUMMARY

In various representative aspects, methods and apparatus for secure access generally comprise a secure interface operating in conjunction with a remote computer and a target machine. The secure interface may provide access to the target machine by the remote computer. The secure interface may comprise a signal transfer system configured to be coupled to the target machine. The signal transfer system may transfer native human I/O signals, but does not transfer files and does not transfer networking signals. The signal transfer system may provide the only couplings between the target machine and the secure interface. The secure interface may also include a network interface coupled to the signal transfer system.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present technology.

DETAILED DESCRIPTION OF EXEMPLARY EMBODIMENTS

Various aspects of the present technology may be described in terms of functional block components and various processing steps. Such functional blocks may be realized by any number of hardware or software components configured to perform the specified functions and achieve the various results. For example, exemplary embodiments of the present technology may employ various computers, processors, controllers, interfaces, communication protocols, couplings, and cables, which may carry out a variety of functions. In addition, various aspects of the present technology may be practiced in conjunction with any number of computer systems, machines, and networks, and the systems and methods described are merely exemplary applications. Further, exemplary embodiments of the present technology may employ any number of conventional techniques for coupling computers, generating computer signals, and the like.

Throughout the specification and the claims, the term "connected" means a direct electrical connection between the things that are connected, without any intermediary devices. The term "coupled" means either a direct electrical connection between the things that are connected, or an indirect connection through one or more passive or active intermediate devices. The meaning of "a," "an," and "the" include plural references. The meaning of "in" includes "in" and "on".

Various representative implementations of the present technology may be applied to any system for coupling electronic devices. Certain representative implementations may include, for example, computers communicating over one or more networks. Methods and apparatus for secure access may operate in conjunction with a secure interface. In various embodiments, the secure interface provides remote access to computers, such as computers in sensitive applications and/or having access to sensitive data, in a way that poses minimal threat to the computer accessed remotely or any of the devices sharing a network with it.

Figure 1:
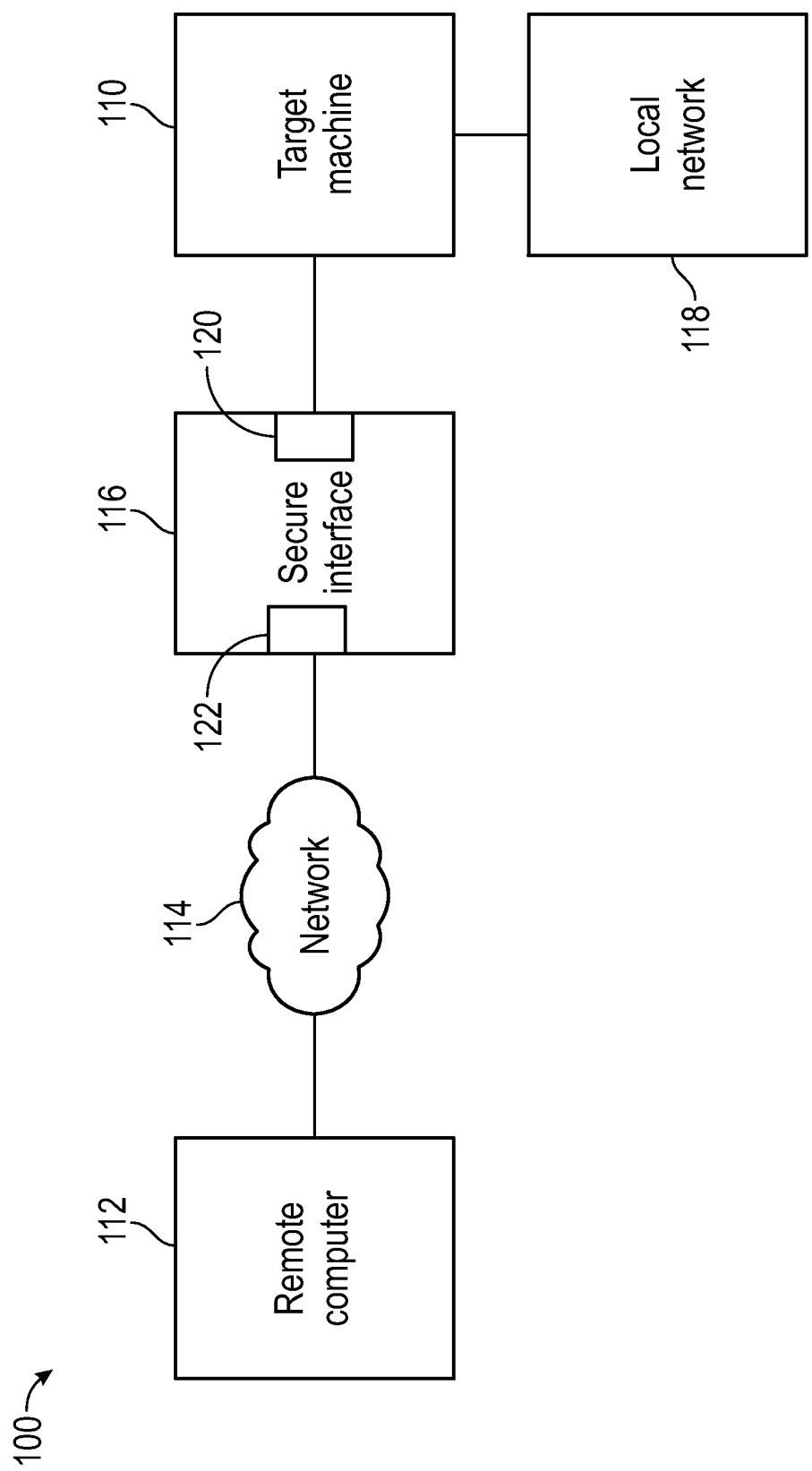
FIG. 1 is a block diagram of a secure interface coupled to a target machine and a remote computer via a network.

In various embodiments, the secure interface provides secure remote access to the target machine's desktop with simple, affordable, and easy to use technology. Referring now to FIG. 1, a secure computer communication system 100 according to various aspects of the present technology may operate in conjunction with a target machine 110, a remote computer 112, a network 114, and a secure interface 116. The remote computer 112 may be coupled to the target machine 110 via the network 114 and the secure interface 116 to view or control the target machine 110, such as via the target machine's 110 desktop.

Figure 2:
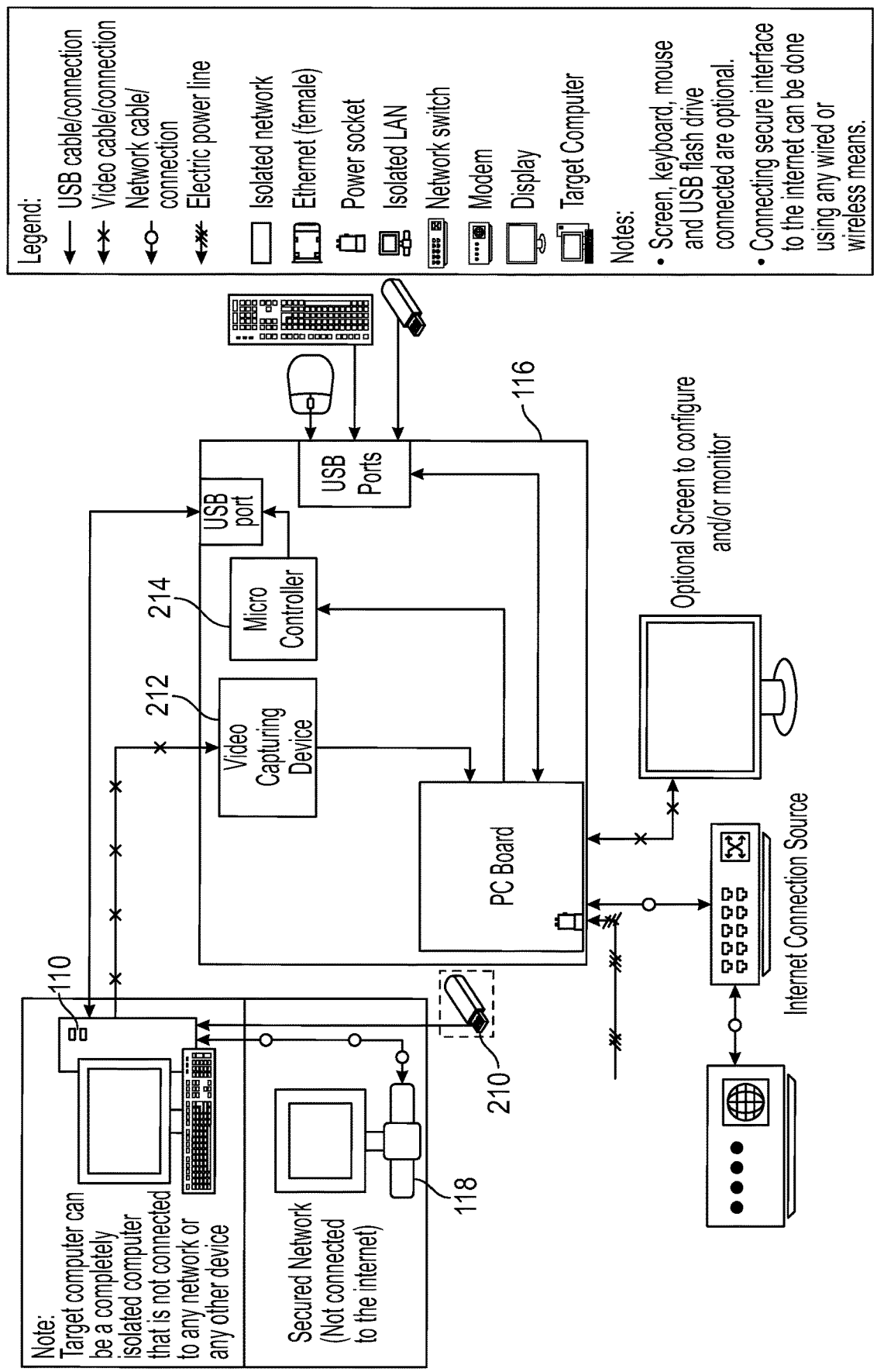
FIG. 2 is a block diagram of a secure interface and a target machine.

The target machine 110 is the computer to be accessed by the remote computer. In various embodiments, the target machine 110 comprises a conventional computer using an operating system, such as a Windows variant, iOS, Linux, a proprietary operating system, or the like. In other embodiments, the target machine 110 is not a computer, but instead a noncomputer machine that may be controlled by electrical signals, such as inputs from input devices like keyboards and tracking devices. Referring to FIG. 2, the target machine 110 may be a standalone machine or may be coupled to other devices, such as via a local secure network 118.

The target machine 110 may include input connectors for coupling to input devices. The target machine 110 may comprise any machine including connectors for coupling to interface devices, such as a monitor, a keyboard, and a tracking device (e.g., a mouse or trackball). For example, the target machine 110 may include conventional input connection points like universal serial bus (USB) connectors and/or PS/2 connectors. The target machine 110 may also include output connectors for connecting to output devices, such as monitors and printers. In other embodiments, one or more of the couplings with other devices may be wireless, such as Wi-Fi, Bluetooth, RF, or other wireless communication technology.

In the present embodiment, the target machine 110 includes one or more USB connectors and one or more video output connectors, such as composite video, VGA, S-Video, DVI, or HDMI connectors. The target machine 110 and the local secure network 118 are not coupled to any nonproprietary networks like the Internet. The target machine 110 may be a secure computer or other machine used in sensitive applications and to be secured from unauthorized access.

In the present embodiment, the target machine 110 may operate in conjunction with a desktop, such as a conventional Windows or Apple iOS desktop providing the primary user interface of the computer. The desktop may include the desktop background or wallpaper and icons of files and folders, as well as a task bar and/or a menu bar.

Referring again to FIG. 1, the remote computer 112 allows a user to control the target machine 110 via the network 114. The remote computer 112 is ordinarily at a location remote from the target machine 110 such that the identity of the user and the remote computer 112 itself cannot be easily verified. The remote computer 112 may comprise any suitable machine for viewing or controlling the target machine via the network 114, such as a conventional computer using an operating system, such as a Windows variant, iOS, Linux, a proprietary operating system, or the like. In other embodiments, the remote computer 112 comprises a mobile device, such as a smartphone or tablet, or a noncomputer machine that may control the target machine 110 by electrical signals, such as signals from input devices like keyboards and tracking devices. The remote computer 112 may have access to the network 114, such as via a conventional Ethernet or IEEE 802.11 wireless coupling.

The remote computer 112 may include input connectors for coupling to input devices. The remote computer 112 may comprise a machine operating in conjunction with human I/O devices, such as a monitor, a keyboard, and a tracking device (e.g., a mouse, trackball, or touchscreen). For example, the remote computer 112 may include conventional input connection points like universal serial bus (USB) connectors and/or PS/2 connectors. The remote computer 112 may also include output connectors for coupling to output devices, such as monitors and printers.

In the present embodiment, the remote computer 112 comprises a conventional personal computer including USB connectors and one or more video output connectors, such as composite video, VGA, S-Video, DVI, or HDMI connectors. The USB connectors may accommodate user input via a keyboard and a tracking device, and the video output connectors provide information to the user via one or more monitors. The remote computer 112 generates user input signals corresponding to the user inputs and provides them via the network 114.

The secure interface 116 may constantly or selectively couple to the network 114. The network 114 may comprise any suitable communications system for coupling the secure interface 116 to other machines, such as a global network like the Internet. The network 114 may comprise, however, other communications systems and/or networks, such as proprietary networks, telephone communications, wireless communications, and combinations of different communications technologies. In various embodiments, the network 114 is a global communications network, and in the present example embodiment, the network 114 includes the Internet.

The secure interface 116 facilitates secure control of the target machine 110 by the remote computer 112 via the network 114, even when the network 114 is unsecured. For example, communication between the secure interface 116 and the target machine 110 may be implemented to inhibit transferring files or any other information other than selected authorized signal types between the secure interface 116 and the target machine 110, such as native human I/O signals.

In various embodiments, couplings to the target machine 110 cannot be used to establish network couplings with the target machine 110 and/or transfer any files between the target machine 110 and the secure interface 116 or any other device coupled to the secure interface 116, whether locally or remotely. This results in isolation between the file system (and the network 118 of the target machine 110 and any devices coupled to it) and the secure interface 116, which inhibits unauthorized use of the target machine 110 through its coupling to the secure interface 116.

The secure interface 116 is responsive to the remote computer 112. For example, the remote computer 112 may be coupled to the secure interface 116 via the Internet utilizing a remote desktop access software, which allows a remote user to couple to the secure interface 116 and work on the target machine's 110 desktop in a manner that resists or completely prevents hacking or other unauthorized access or use of the target machine 110 through its coupling to the secure interface 116.

The secure interface 116 is coupled to the target machine 110. In the present embodiment, the secure interface 116 provides desktop interface between the secure interface 116 and the target machine 110 while providing file system and network isolation between them. Thus, the remote computer 112 may operate like a terminal to view and/or control the target machine's 110 desktop. This inhibits unauthorized access and use of the target machine 110 through the secure interface 116.

In various embodiments, the secure interface 116 provides access to the target machine 110 by the remote computer 112 and comprises a signal transfer system 120 configured to be coupled to the target machine 110. The signal transfer system 120 transfers native human I/O signals, does not transfer files, and does not transfer networking signals. The signal transfer system 120 provides the only couplings to the target machine 110.

Native human I/O signals refer to signals that are generated by and received from standard human input devices that are typically connected to a computer, such as signals generated by standard keyboards and tracking devices, as well as signals that are generated for and received by standard human output devices that are typically connected to a computer, such as monitors. The signal transfer system 120 may be recognized by the target machine 110 as one or more standard human input/output devices, like a keyboard, tracking device, and monitor, and the target machine 110 will treat signals from the signal transfer system 120 as native human I/O signals as if generated by a standard human input device and provide video signals to the signal transfer system 120 as if being provided directly to a monitor.

In various embodiments, the signal transfer system 120 may comprise a keyboard or tracking device emulator that generates native human input signals in response to corresponding input signals received from the remote computer 112 and is recognized by the target machine 110 as a keyboard or tracking device. The signal transfer system 120 may also include systems for receiving native human output signals from the target machine 110 as if the signal transfer system were a typical recipient of the native human output signals, such as a monitor. The configuration of the target machine 110 may not be changed from its ordinary configuration to recognize the signal transfer system 120; no specialized hardware or software may be necessary to operate in conjunction with the signal transfer system 120.

In various embodiments, the signal transfer system 120 may comprise a video transfer system transferring video signals from the target machine 110 to the remote computer 112, for example via a network interface. The signal transfer system 120 may also include an input signal controller transferring only user input signals from the remote computer 112 to the target machine 110, such as via a network interface. The video transfer system and the input signal controller may provide the only communications between the target machine 110 and the secure interface 116.

The secure interface 116 may be coupled to the target machine 110 only with native human I/O signal couplings, i.e., couplings that transfer signals for user input/output devices, such as tracking devices, keyboards, and monitors. In various embodiments, the secure interface 116 includes the signal transfer system 120 configured to be coupled to the target machine 110 that transfers native human I/O signals, does not transfer files, and does not transfer networking signals. The signal transfer system 120 provides the only signals between the target machine 110 and the secure interface 116. The signal transfer system 120 may be responsive to a computer, such as an interface computer 216 of the secure interface 116.

In some embodiments, the only couplings between the secure interface 116 and the target machine 110 provided by the signal transfer system 120 are (1) a video cable providing video signals from the target machine 110 to the secure interface 116 and (2) a USB cable transferring keyboard and/or tracking device signals from the secure interface 116 to the target machine 110. The video and user input connections facilitate desktop interface between the secure interface 116 and the target machine 110 while providing file system and network isolation between the two machines 110, 116. This inhibits unauthorized access and use of the target machine 110 through the secure interface 116. Providing only keyboard and mouse access to the target machine 110 and a desktop view of the target machine 110 inhibits other communication using the two connections.

The secure interface 116 may be configured in any suitable manner to facilitate communications with the remote computer 112 and the target machine 110. In various embodiments, the secure interface 116 receives native human output signals, such as video signals, from the target machine 110 and provides the signals to the remote computer 112, for example for display to the remote user. Referring to FIG. 2, the secure interface 116 includes a video transfer system that receives video signals from the target machine 110 and provides corresponding signals to be provided to the remote computer 112.

In one embodiment, the video transfer system comprises an integrated video stream capture device 212. The video stream capture device 212 may be coupled to target machine 110 to capture the desktop display video stream. The video transfer system may comprise a dedicated system or it may be integrated into the secure interface 116. In one embodiment, the video stream capture device 212 includes a USB 3.0 video stream capture device that can receive the relevant video signals, such as HDMI, DVI, or VGA and provide them to a computer via a USB 3.0 connection at appropriate resolution, such as 1080p, and frame rate, such as 60 fps. In various embodiments, the video stream capture device 212 may also capture audio signals, such as those associated with an HDMI connection. In one embodiment, the video stream capture device 212 includes a StarTech USB3HDCAP.

In various embodiments, the video transfer system is solely a video stream capturing and/or coupling system that does not facilitate file transfers or network communications between the secure interface 116 and the target machine 110. In various embodiments, the secure interface 116 appears and functions as an extra display to the target machine 110. Files cannot be transferred in any direction using this coupling. The video transfer system may be connected directly to the target machine 110 video output via an appropriate video cable that transfers only video signals, such as a VGA cable or DVI cable. In some embodiments, the video cable may also transfer audio signals but not files or network communications, such as an HDMI cable. The coupling may include, however, any suitable system to transfer a video stream (wired or wireless) that does not provide capability for network communication or file transfer.

The secure interface 116 may also be configured to receive user input signals from the remote computer 112 and provide corresponding native human input signals to the target machine 110, for example so that the remote user may interact with the target machine's 110 desktop. User input signals comprise signals generated by a user input device in response to deliberate user input actions, such as signals from a user using a keyboard, mouse, trackball, or touchscreen. In one embodiment, referring to FIG. 2, the secure interface 116 includes at least one input controller 214 coupled to the target machine 110. The secure interface 116 sends keyboard and mouse commands from the remote computer 112 to be processed in the input controller 214 and then transferred to the target machine 110 as native human input signals, which provides file system and network isolation between the secure interface 116 and the target machine 110. In various embodiments, the keyboard and tracking device signals are provided via two separate controllers. In other embodiments, the input controller 214 is omitted, such as to restrict the remote user to only viewing the target machine's 110 desktop.

In various embodiments, the input controller 214 transfers only native human input signals, such as keyboard and mouse (or other tracking device) commands, from the secure interface 116 to the target machine 110, which facilitates isolation in a way that does not allow network sharing or file transfer. The input controller 214 may be a dedicated system or integrated into the secure interface 116.

For example, the input controller 214 may comprise a dedicated microcontroller. The input controller 214 may comprise any suitable system that facilitates transmission of only native human input signals, such as keyboard and mouse signals (or other selected and limited input signals generated by devices typically connected to a computer), that does not allow file transfer or network communications between the secure interface 116 and the target machine 110.

The input controller 214 may be configured to allow a computer to send native human input signals to another computer such that the receiving computer recognizes them as native human input signals, such as keyboard and mouse signals. In the present embodiment, the input controller 214 is implemented as a separate microcontroller coupled to the interface computer 216. The input controller 214 may be a dedicated microcontroller programmed to provide only keyboard and tracking device signals to the target machine 110. The input controller 214 and interface computer 216 may also process special keys and combinations, such as the "Windows" key, ctrl+esc, and ctrl+alt+delete, such that the native human input signals corresponding to special keys and combinations are transmitted to the target machine 110 and not responded to by the interface computer 216, which enhances security and reliability.

In various embodiments, the input controller 214 may be identified as a unique type of keyboard and mouse and may be associated with particular identification credentials, such as a certain serial number or other identifier. The unique identification credentials may verify the coupling of the correct secure interface 116 to the target machine 110. In one embodiment, because there are no communications between the secure interface 116 and the target machine 110 other than the keyboard, mouse, and display, the unique identifier may facilitate verification of an authorized coupling to the target machine 110.

For example, the input controller 214 may provide a unique identifier as a type of USB device such that the identifier is registered by the target computer 110 device manager. Thus, instead of being identified in the device manager as "HID Keyboard Device," the input controller may be identified as "Keyboard device ABC123." The security device 210 may use this information to ensure that the secure interface 116 is authorized, for example by comparing the input controller 214 identifier to an authorized identifier stored on the security device 210.

The secure interface 116 may be coupled to the target machine 110 in any suitable manner, such as a cable to provide keyboard and mouse connections from the secure interface 116 to the target machine 110, such as a conventional USB cable. The coupling may comprise any suitable coupling for transferring keyboard and mouse commands (wired or wireless) that does not facilitate network communications or file transfer. The secure interface 116 may appear as an extra keyboard and mouse in the system of the target machine 110 such that files cannot be transferred in either direction. If the user input coupling is inactive or omitted, the secure interface 116 may function to provide only video to the remote computer 112.

The secure interface 116 may include any other suitable elements and may be configured in any manner to provide the limited couplings between the secure interface 116 and the target machine 110. For example, the secure interface 116 may comprise the interface computer 216 including a CPU, memory, and storage, and may be implemented in any suitable manner, such as a single board or multiple connected boards or devices. The interface computer 216 may use an operating system, such as a Windows operating system or other suitable operating system. The interface computer 216 may be coupled to the signal transfer system 120. In various embodiments, the interface computer 216 is connected to the video stream capture device 212 and the input signal controller 214.

In various embodiments, the interface computer 216 controls the video stream capture device 212 and the input controller 214, and controls the transfer of information between the network 114 and the input controller 214, the video stream capture device 212, and the target machine 110. For example, the interface computer 216 may monitor and control the video stream capture device 212 to ensure that only native human output signals, such as video signals, are received, and monitor and control the input controller 214 to ensure that only native human input signals, such as keyboard and tracking device signals, are provided.

In various embodiments, the interface computer 216 cannot control the nature of the output from the input controller 214 and the video stream capture device 212. The input controller 214 and/or the video stream capture device 212 may be configured such that only keyboard and tracking device signals and/or video signals, respectively, can be provided. For example, the input controller 214 and the video stream capture device 212 may be coded in a way that resists or even prevents alteration except by physically gaining access to the input controller 214 and/or the video stream capture device 212 and reprogramming them. In some embodiments, the input controller 214 and/or the video stream capture device 212 may be hard coded such that they cannot be reprogrammed.

The interface computer 216 may also run security programs to detect and inhibit unauthorized access, signals, or content. The interface computer 216 may also run a remote access program to allow communications with the remote computer 112.

The secure interface 116 may be implemented in a single enclosure, or multiple coupled modules. In various embodiments, the secure interface 116 comprises a single unit in a rigid, secured, and portable enclosure, such as the size of a laptop computer. In other embodiments, the various elements of the secure interface 116 are integrated into a single board, separated into multiple boards, or separated into different enclosures. In one embodiment, the enclosure is made of metal and is secured with secure and tamper-resistant fasteners, such as Key-Rex® screws.

The secure interface 116 also includes a network interface 122 coupled to the signal transfer system 120, for example to couple to networks. The network interface 122 transfers the human I/O signals between the remote computer 112 and the signal transfer system 120. For example, the network interface 122 may facilitate communications between the secure interface 116 and other devices via the network 114, such as a conventional network interface card like an Ethernet, Wi-Fi, fiber optic, or SIM connection. In various embodiments, the network interface 122 is coupled to the video stream capture device 212 and the input signal controller 214. The network interface 122 transfers the video signals to the remote computer 112 and transfers the user input signals to the input signal controller 214.

In the present embodiment, the network interface 122 comprises an Ethernet network interface card. The network interface 122 may also operate with other capabilities and/or external devices to provide additional network capabilities. The network interface 122 facilitates communication with the remote computer 112 via the network 114.

The secure interface 116 may comprise any other suitable elements. For example, the secure interface 116 may include a power supply, such as a converter for converting AC power to DC power and/or a battery. The secure interface 116 may also include cooling systems, such as a fan to dissipate the heat developed by the components in the secure interface 116. The secure interface 116 may also include ports to couple to input devices and monitors, such as to configure and/or monitor the secure interface 116.

The secure interface 116 may implement communications with the remote computer 112 and control and viewing of the target machine 110 in any appropriate manner, including hardware, firmware, software, and combinations thereof. Various systems facilitate communicating with the target machine 110 and configuring access and security for various users, the target machine 110, and the secure interface 116.

In various embodiments, the secure interface 116 includes an access management system for managing the access to the keyboard and mouse commands sent to the target machine 110 and/or video stream from the target machine 110. The access management system may provide for different levels of access and functions for different credentials. For example, the access management system may implement levels such as:

a. Administrator, which gives complete configuration access to the hardware and software of the secure interface 116, including full access to the operating system.

b. Controller, which provides a remote user with rights to view the video stream of the target machine 110 and send keyboard and mouse commands to the target machine 110.

c. Viewer, which provides a remote user only with rights to view the video stream of the target machine 110.

The access management system may be implemented in any suitable manner, such as hardware, software, firmware, or combination thereof. In one embodiment, the secure interface 116 implements a main secured operation system and a scheduler system that manage access to the keyboard and mouse commands sent to the target machine 110 and/or video stream from the target machine 110. The scheduler system may verify the authenticity of secure interface 116 program files and device hardware. The scheduler system may also disable special keys and functions of the secure interface 116 to inhibit access to the operating system for non-administrator users.

The main secured operation system may control initiation and operation of user sessions, including control sessions where the remote user controls the target machine 110 and view sessions where the remote user may only view the video stream from the target machine 110. Control sessions may include capturing and providing the video stream from the target machine 110 as corresponding native human output signals to the remote computer 112 and receiving keyboard and tracking device commands from the remote computer 112 and sending them to the input controller 214 to be translated and transferred to the target machine 110 as corresponding native human input signals. The secure interface 116 may require passwords or other credentials to establish a session and may require high complexity and regularly changing passwords. Session control may also include setting up and sending session invitations and terminating sessions, for example according to user demand or automatically, such as based on administrator-configured conditions.

In one embodiment, the main secured operation system may include an email function, such as a secured email server. The main secured operation system may send and/or facilitate sending session invitation emails to remote users. The emails or other communications may include credentials for additional authentication.

The main secured operation system may also control configuration access and operating system access for administrator users and limit access according to a user's credentials. The main secured operation system may detect remote access changes and implement security actions according to administrator settings and protocols.

In one embodiment, the scheduler and main operation functions are embedded in hardware or firmware. In another embodiment, the functions are implemented in software operating on the interface computer 216 using any suitable programming language and software architecture.

The secure interface 116 may also implement various security measures to control access to the secure interface 116 and the target machine 110. For example, the secure interface 116 may include security measures for protecting the secure interface 116 from unauthorized use. Because the secure interface 116 may be exposed to an unsecured network 114, the secure interface 116 may be subject to hacking attempts, while the target machine 110 is shielded from them.

For example, the secure interface 116 may verify any software programs and data files on the secure interface 116 to ensure that they have not been modified or replaced without authorization. In one embodiment, software installed on a particular secure interface 116 cannot run on any other device, even another secure interface 116. In various embodiments, the secure interface 116 may compare digital signatures of the files of the software programs to stored authorized signatures. The secure interface 116 may also verify hash codes of programs and files. If verification fails, the files cannot be used. In some embodiments, failed verification terminates use of the secure interface 116 such that it cannot be used. Default remote access software programs installed on the secure interface 116 may be configured to prevent the remote user from transferring files and/or establishing network communications between the remote computer 112 and the secure interface 116 for added security.

The secure interface 116 may implement additional security features, for example at the option of an administrator:

Time limited sessions

Automatic logout of the remote user at the end of a time-limited session

Automatic shutdown of the secure interface 116 at the end of a remote session Configurable time-out and end of session in response to remote computer 112 inactivity Automatic logout of the remote user at the end of a session in response to remote computer 112 inactivity Automatic shutdown of the secure interface 116 at the end of a session in response to remote computer 112 inactivity Automatic logout of the user when a session is terminated by the user Automatic shutdown of the secure interface 116 when a session is terminated by the user Automatic end of a session on detected changes of remote access characteristics or the remote computer 112 (protects the system in case of successful hijacking of the remote session)

Auto logout user on detected changes of remote access characteristics or the remote computer 112 (protects the system in case of successful hijacking of the remote session)

Auto shutdown of the secure interface 116 on detected changes of remote access characteristics or the remote computer 112 (protects the system in case of successful hijacking of the remote session)

The secure interface 116 may be configured to require additional hardware and/or software safeguards. In various embodiments, the secure interface 116 may require extra hardware and/or software authentication to start a control or a view session on the secure interface 116, such as a human interaction at the target machine 110 using dedicated hardware and software on a security device 210.

In various embodiments, the security device 210 may comprise a conventional software licensing dongle. In alternative embodiments, the security device 210 includes verification information and/or software for verifying authorization of the secure interface 116. In various embodiments, the security device 210 may run an authentication software program, for example on the security device 210, to start a session. The security device 210 may comprise any appropriate hardware medium, such as a storage medium or a device with a processor.

In the present embodiment, the security device 210 may run at least a portion of the security software, such that the secure interface 116 cannot start a session without proper installation of the security device 210 and successful completion of the security software. The authentication between the secure interface 116 and the target machine 110 using the security device 210 may be hardware- and time-based and time sensitive. For example, authentication codes may have a limited validity time to eliminate the possibility of decryption, such as a maximum of 60 seconds. In various embodiments, the authentication software may run on an external storage medium, such as a USB drive, functioning as the security device 210 or may be configured to run directly on the target machine 110. The authentication software may provide encrypted manual authentication between the secure interface 116 and the target machine 110.

In one embodiment, the security device 210 is dedicated to the secure interface 116 and/or the target machine 110 such that the secure interface 116 cannot start a session on the target machine 110 without the dedicated security device 210. In addition, if any unauthorized changes in the secure interface 116, target machine 110, or security device 210 are detected, the session may be prevented or terminated.

The security software on the secure interface 116 and security device 210 may also be dedicated to the particular devices 116, 210, 110 such that the software will not run on any other device and cannot be used on any target machine other than the dedicated target machine 110. For example, the security device 210 may be configured to detect the digital specifications and serial numbers of hardware components of the secure interface 116 and/or the target machine 110 to dedicate the security device 210 to the secure interface 116 and/or the target machine 110.

To operate the secure interface 116, the secure interface 116 may be initially configured. The initial configuration sets up the secure interface 116 to securely communicate with the target machine 110 and/or the remote computer 112. In various embodiments, the initial configuration collects information about the secure interface 116, the remote computer 112, the security device 210, and/or the target machine 110 to enhance security.

Figure 3:
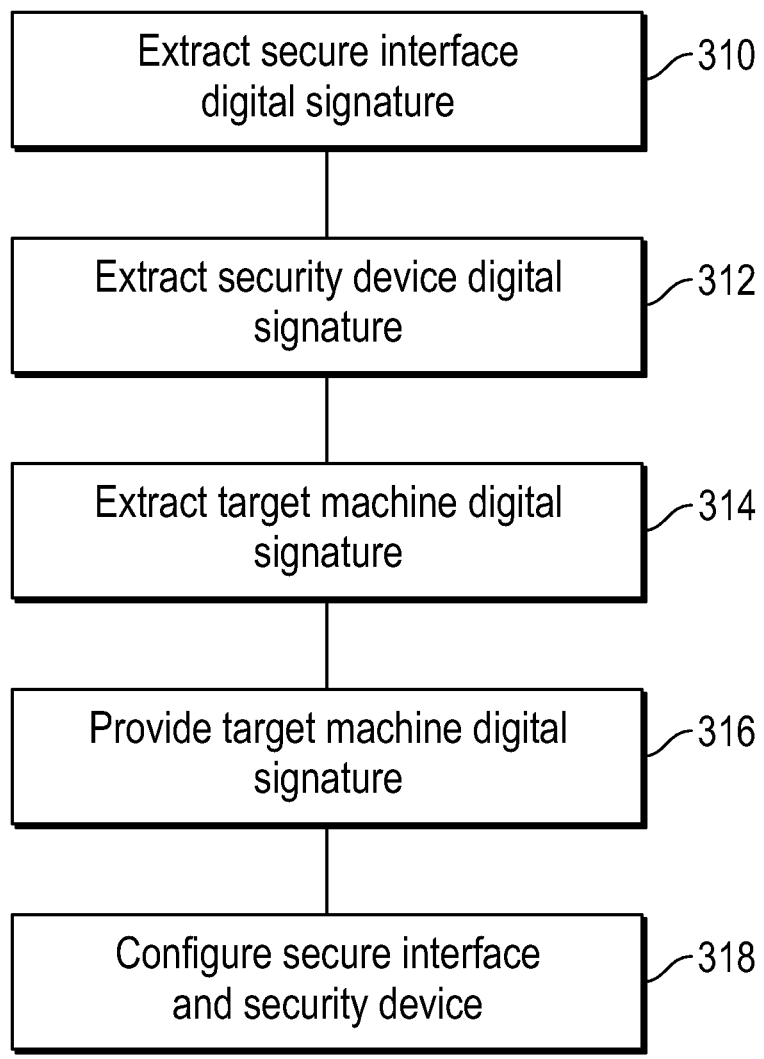
FIG. 3 is a flow diagram of an initial configuration process.

Referring to FIG. 3, the initial configuration may include collecting information unique to various elements, such as digital signatures or other unique identifiers of the secure interface 116, the security device 210, and the target machine 110. In various embodiments, the digital signature comprises a combination of serial numbers of software and/or hardware components.

For example, the digital signature may be extracted from the secure interface 116 and the security device 210 by the provider of the secure interface 116 and the security device 210. The digital signature may be extracted in any appropriate manner, such as using software running on the particular secure interface 116 (310) and security device 210 (312). The digital signature of the target machine 110 may be extracted by the owner of the target machine 110, such as by running software on the target machine 110 and producing the digital signature in a very secure encrypted format (314). The encrypted digital signature may be provided to the provider of the secure interface 116 and the security device 210 (316) to be decrypted and used in the configuration of the secure interface 116 and the security device 210 (318).

The main operation software of the secure interface 116 may be compiled with the digital signatures of the secure interface 116, the security device 210, and/or the target machine 110 hard coded in it such that a unique software configuration is provided for every secure interface 116 and installed on it. Likewise, the main operation software of the security device 210 may be compiled with the digital signatures of the secure interface 116, the security device 210, and/or the target machine 110 hard coded in it such that a unique software configuration is provided for every security device 210 and installed on it.

To remotely access the target machine 110 via the secure interface 116, the secure interface 116 is coupled to the target machine 110 and authenticated. A remote session may be initiated at the remote computer 112 and authenticated. If all elements of the session are verified, the user may access the target machine 110 via the remote computer 112 and the secure interface 116. The secure interface 116 captures video from the target machine 110 and provides the video to the user via the remote computer 112. The secure interface 116 also receives user input signals, such as keyboard and tracking device information, from the remote computer 112 and provides corresponding native human input signals to the target machine 110 to control the target machine 110. If a security issue arises at any time during the session, the secure interface 116 may remediate, such as by terminating the session.

Figure 4A:
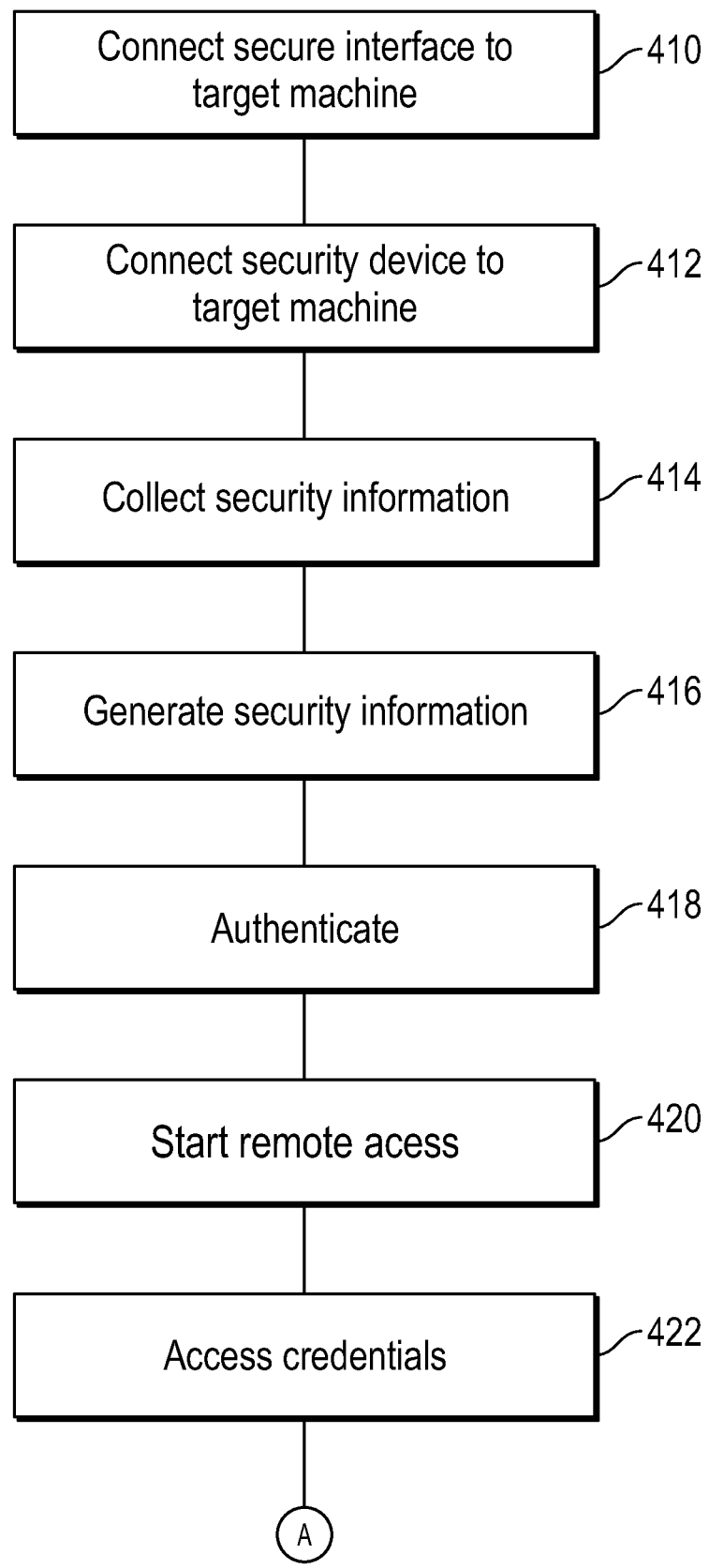
FIGS. 4A-B are a flow diagram of a remote access session for view or control.
Figure 4B:
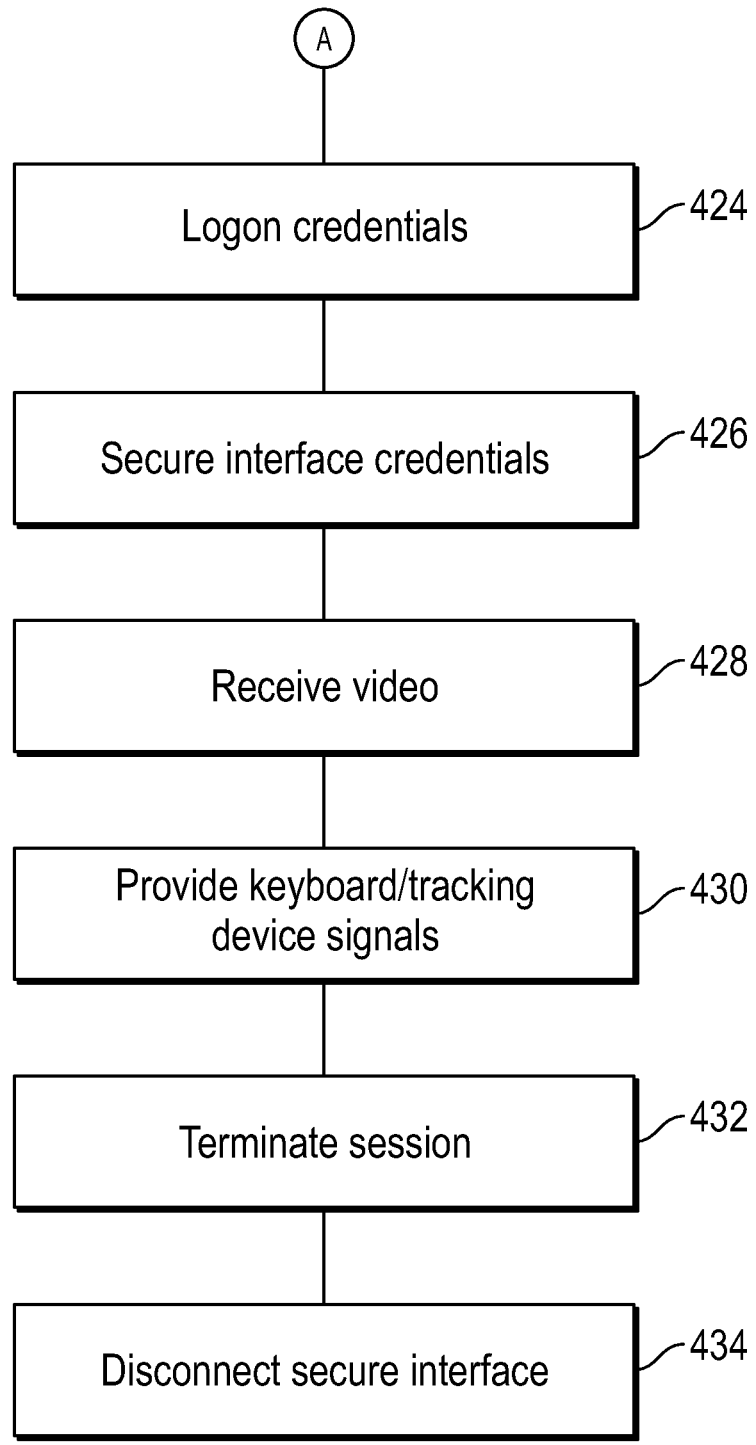

For example, referring to FIGS. 4A-B, the secure interface 116 may be coupled to the target machine 110, such as via the keyboard, tracking device, and video couplings (410). One embodiment comprises coupling the secure interface 116 to the target machine 110, including coupling the video transfer system to the target machine 110, such as by connecting the video output of the target machine 110 to the video transfer system with a conventional video cable. The embodiment may also include coupling the input signal controller 214 to the target machine 110, such as by connecting a USB port on the target machine 110 to the input signal controller 214 with a conventional USB cable. In the present embodiment, no other couplings are provided between the target machine 110 and the secure interface 116.

In operation, the secure interface 116 transfers only video signals (and, in some cases, an audio component of the video signal) from the target machine 110 to the remote computer 112 via the video transfer system, and transfers only native human input signals corresponding to user input signals from the remote computer 112 to the target machine 110 via the input signal controller 214.

The security device 210 may also be coupled, for example to a USB port on the target machine 110 (412). The secure interface 116 and/or the security device 210 may run security programs, such as the main secured operation system and the scheduler system, wherein the security device 210 provides verification information verifying authorization of the secure interface 116. The security programs may collect information relating to the target machine 110, secure interface 116, and security device 210, such as programs, files, components, and serial numbers, and generate the required security information, such as digital signatures and hashes, for programs, files, components, and serial numbers (414, 416).

The security programs may authenticate the hardware and software, such as by comparing the collected information and generated security information to the stored versions of the corresponding information, such as the stored digital signatures (418). If they do not match, the session may be terminated or other action may be taken. In the present embodiment, the session must meet double-encrypted authentication requirements between the secure interface 116 and the target machine 110 using authentication software running on the security device 210.

If the security requirements are met, the user may request remote access on the remote computer 112, such as by clicking on a link in an email from the secure interface 116. The secure interface 116 may respond to the request, such as using Microsoft® Remote Desktop Connection, TeamViewer, or any other suitable desktop remote access software (420). The remote computer 112 may submit access credentials to the secure interface 116 to establish the remote access to the secure interface 116 (422). Any additional appropriate credentials may be required, such as operating system logon credentials (e.g., username and password of the user) for accessing the secure interface 116, and Controller or Viewer access level passwords for the secure interface 116 (424, 426).

If security requirements are met, the secure interface 116 grants access to target machine 110 using remote computer 112 via secure interface 116. The secure interface 116 captures video from the target machine 110 and provides the video to the user via the remote computer 112 (428). The secure interface 116 also receives user input signals, such as keyboard and tracking device information, from the remote computer 112 and provides corresponding native human input signals to the target machine 110 to control the target machine 110 (430). If a security issue arises at any time during the session, the secure interface 116 may remediate, such as by terminating the session.

When the session terminates, the target machine 110 coupling to the remote computer 112 is terminated (432). The security device 210 and secure interface 116 may be decoupled from the target machine 110 (434).

The secure interface 116 may provide enhanced security by limiting communications between the secure interface 116 and the target machine 110 to providing only native human input signals to the target machine 110 and receiving only native human output signals from the target machine 110. For example, the use of keyboard and mouse couplings and a video stream coupling provide desktop access to the target machine 110 from a remote computer 112 while also providing isolation of network and file systems between them. As a result, hacking the target machine 110 becomes more difficult and potentially impossible. Because the target machine 110 may be accessed securely, authorized operations may be performed remotely without concerns of exposing the target machine 110 to potential unauthorized access, which saves time and treasure associated with on-site visits and enhances convenience. The secure interface 116 is easy to use and fast to set up and use.

The secure interface 116 may also facilitate securing the software program files and verifying them. The secure interface 116 may further facilitate detection of changes in remote access coupling to the secure interface 116 and permit terminating the session on detection of such changes to protect against hijacking of the remote session. In addition, the security device 210 may provide a manual, hardware-based, time-based, and time sensitive encrypted authentication between the target machine 110 and the secure interface 116 to start a session.

In the foregoing specification, the technology has been described with reference to specific exemplary embodiments. Various modifications and changes may be made, however, without departing from the scope of the present technology as set forth in the claims. The specification and figures are illustrative, not restrictive, and modifications are intended to be included within the scope of the present technology. Accordingly, the scope of the technology should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise," "comprises," "comprising," "having," "including," "includes," or any variations of such terms, are intended to reference a non-exclusive inclusion, such that a process, method, article, composition, or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present technology, in addition to those not specifically recited, may be varied or otherwise particularly adapted to specific environments, manufacturing specifications, design parameters, or other operating requirements without departing from the general principles of the same.

The invention claimed is:

1. A secure interface for providing access to a target machine by a remote computer providing user input signals and receiving output signals, comprising:
   a signal transfer system configured to be coupled to the target machine, wherein:
      the signal transfer system transfers native human input signals corresponding to the user input signals to the target machine, receives native human output signals from the target machine, does not transfer files with the target machine, and does not transfer networking signals with the target machine; and
      the signal transfer system provides the only coupling between the secure interface and the target machine; and
   a network interface coupled to the signal transfer system, wherein the network interface communicates the user input signals to the signal transfer system and the native human output signals to the remote computer.

2. A secure interface according to claim 1, wherein the signal transfer system comprises a video transfer system transferring only video signals from the target machine to the network interface.

3. A secure interface according to claim 1, wherein the signal transfer system comprises an input signal controller providing only the native human input signals corresponding to the user input signals to the target machine.

4. A secure interface according to claim 1, wherein the signal transfer system comprises:
   a video transfer system transferring video signals from the target machine to the remote computer via the network interface; and an input signal controller transferring only the native human input signals from the remote computer to the target machine;

wherein the video transfer system and the input signal controller provide the only couplings between the secure interface and the target machine.

5. A secure interface according to claim 4, wherein the network interface is coupled to the video transfer system and the input signal controller, wherein the network interface transfers the video signals to the remote computer and transfers the user input signals to the input signal controller.

6. A secure interface according to claim 4, further comprising an interface computer coupled to the video transfer system and the input signal controller, wherein the interface computer controls the video transfer system and the input signal controller.

7. A secure interface according to claim 1, further comprising a video cable connecting the signal transfer system to the target machine.

8. A secure interface according to claim 1, further comprising a USB cable connecting the signal transfer system to the target machine.

9. A secure interface according to claim 1, further comprising a security device configured to be coupled to the target machine, wherein the security device includes verification information verifying authorization of the secure interface.

10. A secure interface according to claim 1, wherein the secure interface can only transfer signals with a single target machine.

11. A secure interface for providing access to a target machine by a remote computer generating user input signals, comprising:
 a signal transfer system configured to be coupled to the target machine, comprising:
  a video transfer system receiving only native human output signals from the target machine via a cable;
  an input signal controller transferring only native human input signals corresponding the user input signals to the target machine via a USB cable;
  wherein the signal transfer system provides no other couplings to the target machine, does not transfer files with the target machine, and does not transfer networking signals with the target machine; and
 an interface computer coupled to the video transfer system and the input signal controller, wherein the interface computer controls the video transfer system and the input signal controller; and
 a network interface coupled to interface computer, wherein the network interface transfers the video signals to the remote computer and transfers the user input signals to the input signal controller; and
 wherein the cable and the USB cable are the only couplings between the secure interface and the target machine.

12. A secure interface according to claim 11, further comprising a security device configured to be coupled to the target machine, wherein the security device includes verification information verifying authorization of the secure interface.

13. A secure interface according to claim 11, wherein the secure interface can only transfer signals with a single target machine.

14. A method for securely controlling a target machine from a remote computer, comprising:
 coupling a secure interface device to the target machine, comprising:
  coupling a video transfer system to the target machine;
  coupling an input signal controller to the target machine; and
  providing no other couplings between the secure interface device and the target machine, not transferring files with the target machine, and not transferring networking signals with the target machine;
 transferring only video signals from the target machine to the remote computer via the video transfer system; and
 transferring only native human input signals corresponding to the user input signals to the target machine via the input signal controller.

15. The method of claim 14, wherein coupling the video transfer system to the target machine comprises connecting a video cable to the video transfer system and the target machine.

16. The method of claim 14, wherein coupling the input signal controller to the target machine comprises connecting a USB cable to the input signal controller and the target machine.

17. The method of claim 14, further comprising:
 coupling a security device to the target machine; and
 running a security program, wherein the security device provides verification information verifying authorization of the secure interface.

18. The method of claim 14, wherein the secure interface can only transfer signals with a single target machine.

19. The method of claim 14, further comprising isolating the target machine from the secure interface by preventing file transfer signals and network signals between the target machine and secure interface.

20. The method of claim 14, further comprising coupling the secure interface to the remote computer via a global network.

* * * * *